No. 697,054. Patented Apr. 8, 1902.
F. WIGGINS.
SELF TIGHTENING KEY FOR PULLEYS.
(Application filed Mar. 2, 1901. Renewed Dec. 26, 1901.)
(No Model.)
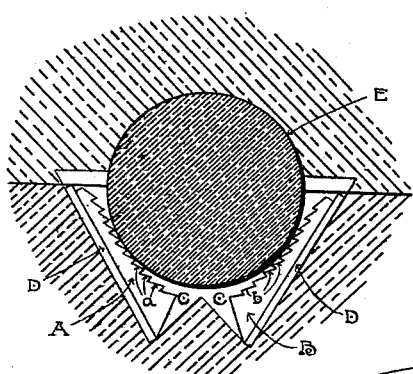
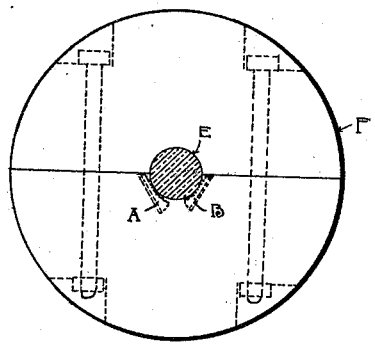
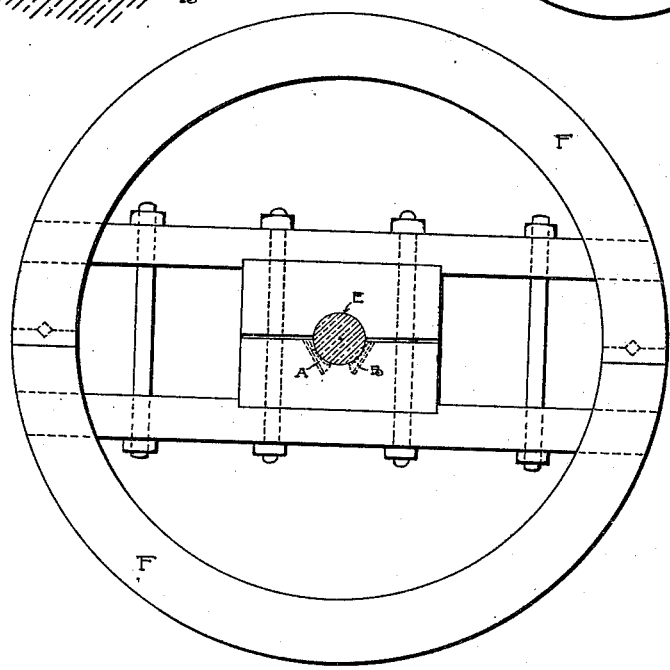
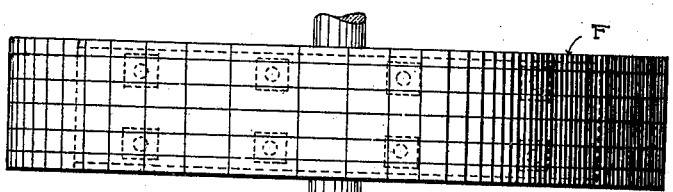
WITNESSES: Jno. W. Berry, G. W. Bullard
INVENTOR: Frank Wiggins

UNITED STATES PATENT OFFICE.

FRANK WIGGINS, OF TACOMA, WASHINGTON.

SELF-TIGHTENING KEY FOR PULLEYS.

SPECIFICATION forming part of Letters Patent No. 697,054, dated April 8, 1902.

Application filed March 2, 1901. Renewed December 26, 1901. Serial No. 87,277. (No model.)

*To all whom it may concern:*

Be it known that I, FRANK WIGGINS, a citizen of the United States, residing at 614 Oakes street, in the city of Tacoma, county of Pierce, and State of Washington, have invented certain new and useful Improvements in Self-Tightening Keys for Pulleys, of which the following is a specification.

My invention pertains to devices for attaching pulleys to shafting, so that a shaft may be turned thereby or the pulleys by the shaft. It has for its object the fixing of a pulley to a shaft without the use of keyways and key or of set-screws or other means commonly used to fix pulleys to and on shafting. It is more particularly designed for split pulleys and provides a means for fixing the same at any point on a shaft by a self-tightening device, which clutches the shaft automatically after being bolted thereon, and the same is made to revolve.

I attain the objects mentioned by means of the device illustrated in the accompanying drawings, in which—

Figure 1 is a full-size cross-section of a shaft, showing the self-tightening clutch or clutches within the pulley applied thereto. Fig. 2 represents a small block split pulley drawn to a reduced scale with the self-tightening clutches indicated as concealed therein. Fig. 3 is a side elevation of a larger split pulley mounted on a shaft with the self-tightening clutches indicated as used therein, and Fig. 4 is a top view of Fig. 3.

Similar letters refer to similar parts in the several views.

My invention comprises one or more wedge-shaped hardened-steel pieces A and B, with clutch-teeth $a$ and $b$ cut in one side of each, as seen in Fig. 1. The clutch side is preferably made concave, so as to conform more nearly to the roundness of the shaft E. The wedge-shaped clutches are placed in cavities C within the pulley, as shown, with a smooth bed, on which the clutches may rest. In wooden pulleys a metal bed or slide piece D is placed under the clutch-pieces in order that they may slide thereon.

It will be observed that when the shaft E is turned to the right or the wheel F is turned to the left the clutch-piece A with its teeth bites into the shaft E, and A slides on D until wheel F is made tight on the shaft E. The greater the strain on the pulley the more tightly will the clutch grip the shaft. When the motion is reversed, the same action takes place with the clutch B, and the pulley is fixed for both a right and left movement. By this means I provide a self-tightening clutch for pulleys to fix the same on a shaft for turning the same in one or both directions.

The drawings illustrate my invention as applied to two forms of wooden split pulleys. I am not limited to its use in split or wooden pulleys only, but I can apply it to both metal and solid pulleys by cutting a cavity, as indicated in Fig. 1, in one or both sides of a pulley and fitting the sliding wedge-shaped clutch therein, when the action is the same as already described. In the same manner my invention may also be applied to a crank or other appliances used in turning a shaft. It is to be observed that it is not necessary for a wheel or crank to fit the shaft with nicety, for my invention being self-tightening the wheel is made to adjust itself to the shaft and fix itself firmly thereto.

In narrow pulleys one clutch or one pair of clutches will prove sufficient in setting a wheel, and in wide pulleys two or more clutches or pairs of clutches may be used for setting the same on a shaft.

Having thus described my invention, what I claim as new, and desire to secure by Letters Patent, is—

In combination with a shaft and split pulley, one of the adjacent edges of the section of said pulley being recessed, the bottoms of the recesses being straight and inclined in relation to each other, the oppositely-disposed keys curved on their inner toothed faces, and straight on their opposite faces to correspond with the walls of said recesses, as set forth.

In testimony whereof I affix my signature in the presence of two witnesses.

FRANK WIGGINS.

Witnesses:
G. W. BULLARD,
JAMES M. HARRIS.